(12) United States Patent  
Tomikawa (10) Patent No.: US 8,098,338 B2
(45) Date of Patent: Jan. 17, 2012

(54) LIQUID CRYSTAL TELEVISION INCLUDING A LEFT SPEAKER AND A RIGHT SPEAKER FOR OUTPUTTING AUDIO BASED ON AN AUDIO SIGNAL

(75) Inventor: Kazuhiro Tomikawa, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1156 days.

(21) Appl. No.: 11/901,401

(22) Filed: Sep. 17, 2007

(65) Prior Publication Data

US 2008/0068531 A1 Mar. 20, 2008

(30) Foreign Application Priority Data

Sep. 19, 2006 (JP) ................................ 2006-252682

(51) Int. Cl.
 *H04N 3/14* (2006.01)
 *H04N 5/64* (2006.01)
 *G02F 1/1333* (2006.01)
(52) U.S. Cl. ......................................... 348/790; 349/58
(58) Field of Classification Search .................. 348/790, 348/794; 349/58
See application file for complete search history.

(56) References Cited

U.S. PATENT DOCUMENTS 7,120,010 B2 * 10/2006 Tajima ..................... 361/679.21
2005/0115735 A1 6/2005 Iwai

FOREIGN PATENT DOCUMENTS

| JP | 63-074873 U | 5/1988 |
| JP | 09-327083 | 12/1997 |
| JP | 63-074873 U | 5/1998 |
| JP | 2005-130097 | 5/2005 |
| JP | 2005-284053 | 10/2005 |

OTHER PUBLICATIONS

The extended European Search Report dated Aug. 23, 2011.

* cited by examiner

*Primary Examiner* — Hoang-Vu A Nguyen-Ba
(74) *Attorney, Agent, or Firm* — Yokoi & Co. U.S.A., Inc.; Toshiyuki Yokoi (57) ABSTRACT

An audio signal is transmitted to a sensor substrate D through a cable 60c connecting the lower end of an analog substrate A arranged on the rear face of the liquid crystal panel and the sensor substrate arranged below the liquid crystal panel of a cabinet. The cable 60c is covered with UL tube in advance, and connected by being passed through the inside of a horseshoe shape of a lower bridge pier portion 52b3 of the right bridge frame 52b. The audio signal is transmitted to the speakers 53a, 53b connected to the connectors 61a, 61b with lead wires by the pattern on the sensor substrate D.

2 Claims, 7 Drawing Sheets

PRIOR ART

LIQUID CRYSTAL TELEVISION INCLUDING A LEFT SPEAKER AND A RIGHT SPEAKER FOR OUTPUTTING AUDIO BASED ON AN AUDIO SIGNAL

CROSS-REFERENCES TO RELATED APPLICATIONS

The present application is related to the Japanese Patent Application No. 2006-252682, filed Sep. 19, 2006, the entire disclosure of which is expressly incorporated by reference herein.

BACKGROUND OF THE INVENTION (1) Field of the Invention

The present invention relates to liquid crystal televisions, in particular, to a liquid crystal television in which a substrate mounted with an audio signal processing circuit is arranged on the rear face side of a liquid crystal panel.

(2) Description of Related Art

In general, televisions have audio signal processing circuits that generate audio signals and output the audio signals to speakers attached to cabinets to thereby reproduce audios. Japanese Unexamined Patent Application Publication No. 9-327083 discloses a technique wherein a speaker is connected to a connector arranged on a substrate with a lead wire, through which the audio signal is transmitted to the speaker.

Japanese Unexamined Utility Model Application Publication No. 63-74873 discloses a technique wherein an outlet plug is arranged on a substrate, a connector to be fitted with the outlet plug is arranged on a cabinet, and a speaker is connected to the connector with the lead wire in advance, so that the outlet plug and the connector are connected with each other when the substrate is arranged on the cabinet.

Japanese Unexamined Patent Application Publication No. 2005-284053 discloses a technique wherein plural connector terminal groups electrically connected to a liquid crystal panel and a speaker are formed at a connector portion on a flexible substrate, so that the connectors to be connected with external equipments, drivers, and the like are collected to a group.

Japanese Unexamined Patent Application Publication No. 2005-130097 discloses a technique wherein in order to fix the cable on the wiring path, plural rib strips are arranged on one of the cabinets and fit-in parts to be fitted with the rib strips on the other cabinet, passing the cable between the ribs in a zigzag form, and fitting the fit-in parts to the rib strips.

Liquid crystal televisions however have lesser spaces for arranging lead wires as compared to cathode ray televisions and plasma televisions, leading to necessary consideration to creeping distance from a power supply circuit (in particular, primary side) and interference with the edges of other components and thus causing the difficulty in selecting the wiring path of the lead wire. The wiring of the lead wire in the conventional liquid crystal television will be described below.

Figure 7:
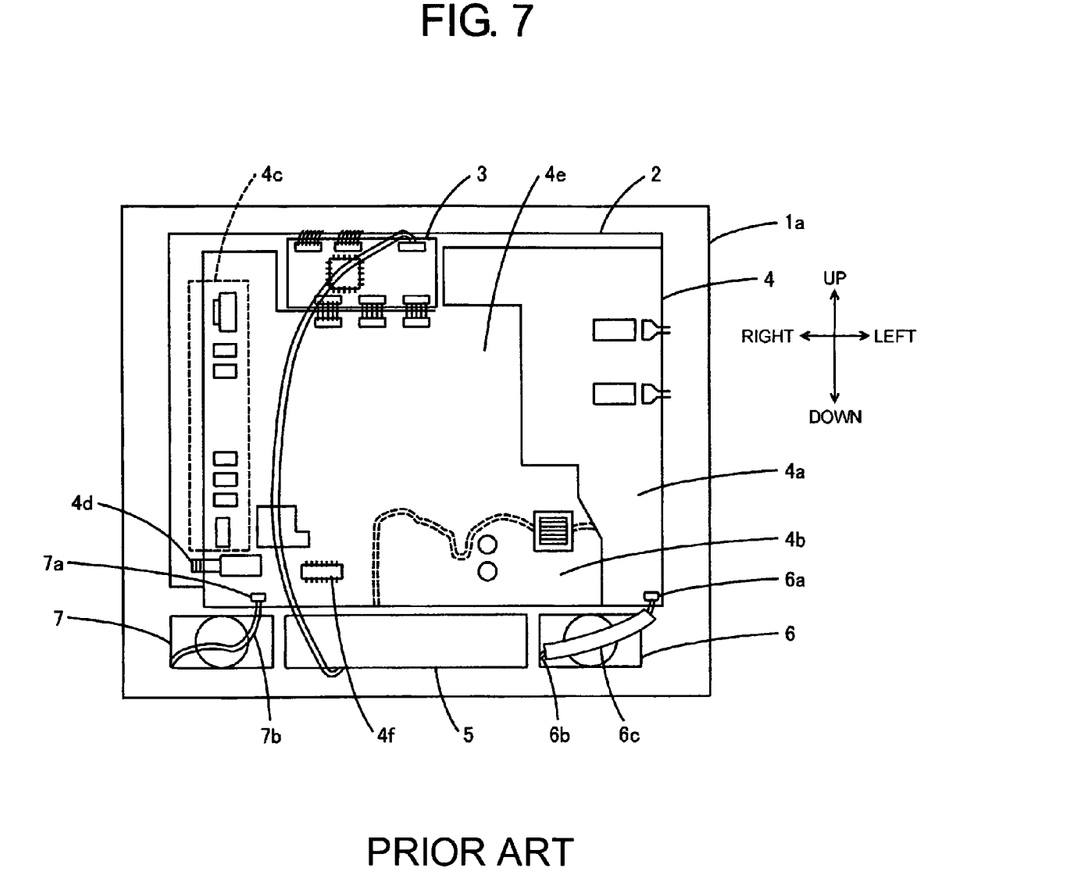
FIG. 7 is a rear view showing the interior of a cabinet of a compact liquid crystal television of the conventional art.

FIG. 7 shows a rear view of a compact liquid crystal television 1 in which the interior of its cabinet are shown with a rear cabinet of the compact liquid crystal television 1 removed. Conventional liquid crystal television has a substrate and a speaker connected thereto as shown in FIG. 7.

A liquid crystal panel 2 has a display face facing to a front cabinet 1a. The top and bottom faces, left and right side surfaces, and a rear face of the liquid crystal panel 2 are covered with a metal case, on which rear face various substrates are mounted and fixed. The front cabinet 1a has a space whose lower side is not used for arranging the liquid crystal panel 2. To the left and right of the space a left speaker 6 and a right speaker 7 are attached respectively and to the central part of the space a sensor substrate 5 is attached. The sensor substrate 5 includes a light receiving circuit for receiving a remote control signal, and an LED for notifying the state of the liquid crystal television 1.

On the rear face of the liquid crystal panel 2, a digital substrate 3 and an analog substrate 4 are arranged. On the upper side of the analog substrate 4, formed is a square cut-out portion, in accordance with which the digital substrate 3 of a substantially rectangular shape is arranged. On the digital substrate 3, a digital image signal processing circuit is mounted, where the processed image signal is output to the liquid crystal panel from an LVDS terminal on the upper end.

On the analog substrate 4, an inverter circuit 4a is formed in the region from the right side to the upper right, and a power supply circuit 4b is formed in the lower right region. Furthermore, a tuner circuit including a tuner 4d, an audio signal processing circuit including an audio amplifier 4f, an analog signal processing circuit 4e of input/output circuit etc. including a jack 4c are formed in the region from the center to the left side of the analog substrate 4.

Regarding the audio signal output from the audio amplifier 4f, the right channel is output to the speaker 7 via a connector 7a and a lead wire 7b, and the left channel is output to the left speaker 6 via a connector 6a and a lead wire 6b by the pattern formed on the analog substrate 4. Since the lead wire 6b is wired at a position close to the power supply circuit 4b, UL tube is attached for ensuring the creeping distance. The UL tube is a tube made of flame retardant rubber, which suffers from high cost by about 0.2 US dollars per tube.

The power supply circuit 4b is formed along the lower side end of the analog substrate 4 in order to reduce the creeping surface with other circuits and to keep the weight balance of the entire liquid crystal television 1, resulting in that the lead wire passes near the power supply circuit 4b regardless of the position of the analog substrate 4 the lead wire is pulled out. Thus, the UL tube must be used for the lead wire, and high cost is inevitable. Such problem cannot be solved with the techniques of the documents described above.

BRIEF SUMMARY OF THE INVENTION

The present invention discloses a liquid crystal television capable of realizing the connection when connecting the speaker and the audio circuit with the lead wire in the cabinet even if components having sharp edges or a power supply circuit that requires ensuring of creeping distance exist on the connection path without being affected by such components and power supply circuit and while avoiding increase in cost of the product.

According to one aspect of the present invention, a liquid crystal television is provided, a liquid crystal panel for displaying an image based on an image signal on a display face; a substrate arranged on a rear face of the liquid crystal panel, for performing a predetermined signal processing on an input audio signal and outputting a processed signal; a cabinet including a substantially rectangular hole for exposing the display face to a front and accommodating the liquid crystal panel and the substrate on an inside; fixing sheet metals for fixing the liquid crystal panel to the cabinet while covering at least one part of the rear face of the liquid crystal panel; a left bridge frame and a right bridge frame fixed to the fixing sheet metals; a sensor substrate fixed below the liquid crystal panel in an interior of the cabinet, the sensor substrate connected with a cable for transmitting a received remote control signal to a connector of the substrate; a left speaker arranged and fixed on an outer side to a left of the left bridge frame at below the liquid crystal panel in an interior of the cabinet, for outputting audio based on the audio signal; and a right speaker arranged and fixed on an outer side to a right of a right bridge frame at below the liquid crystal panel in the interior of the cabinet, for outputting audio based on the audio signal; the cable is covered with a protective tube; the left bridge frame traverses a left side end of the substrate or an outer side of the left side end of the substrate in the up-down direction; the right bridge frame traverses a right side end of the substrate or an outer side of the right side end of the substrate in the up-down direction; a power supply circuit is formed at a prescribed position of lower corners on the substrate; the connector is arranged at a position that is vicinity of lower corners of the substrate and is away from the power supply circuit; a pattern for transmitting the audio signal to the connector is formed on the substrate, the audio signal output to the sensor substrate via the cable; and the audio signal is transmitted from the sensor substrate to the right speaker and the left speaker through lead wires.

According to such configuration, the audio signal is transmitted to the sensor substrate by the cable conventionally covered with protective cable, and the audio signal is transmitted from the sensor substrate to the right speaker and the left speaker through lead wires that pass through a passage that does not need to be covered with a protective cable. The cable may be bundled beforehand, or plural cables may be bundled. The protective tube is a flame retardant tube provided to electrically insulate the outside and the inside of the tube and to protect the interior of the tube from breaking.

In other words, since the cable for connecting the connector of the substrate and the sensor substrate is covered with a protective tube, the cable will not be broken by the left bridge frame or the right bridge frame. The lead wires connected from the sensor substrate to the speakers will not interfere with the left bridge frame or the right bridge frame since the right bridge frame and the right bridge frame are positioned on the rear face side compared to the liquid crystal panel, and the sensor substrate is positioned on the front surface side compared to the liquid crystal panel. This can eliminate the need of covering the lead wires with a protective tube. In other words, with use of the cable that is normally required for transmitting signals and that needs to be covered with a protective tube, signals are transmitted to the sensor substrate. This can eliminate the need of more new protective tubes and keep cost low.

According to the aspect of the present invention, the audio signal is transmitted to the sensor substrate by the cable covered with a protective cable, and the audio signal is transmitted from the sensor substrate to the right speaker and the left speaker through lead wires passing through the passage that do not need to be covered with protective cable, making it possible to provide a liquid crystal television with its cost kept low.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments. Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, such variations and alternate embodiments are contemplated, and can be made without departing from the spirit and scope of the invention.

Embodiments according to the present invention will be discussed in the following order.

Figure 1:
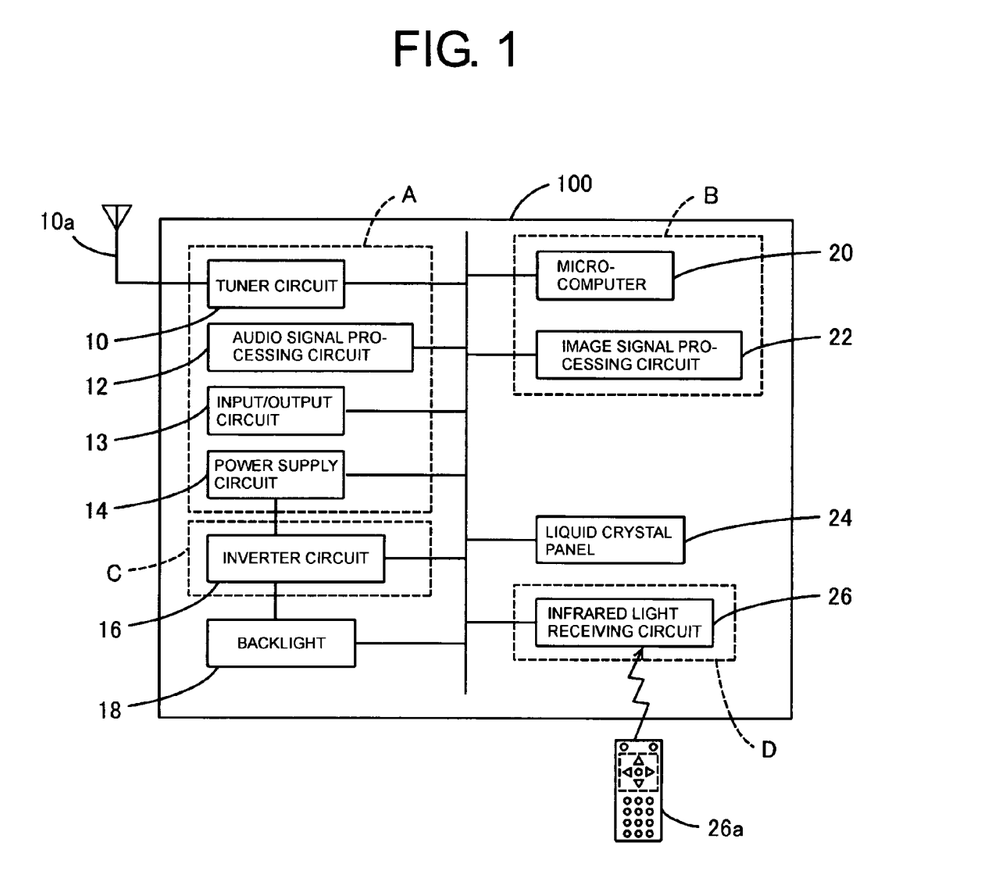
FIG. 1 shows one example of a block diagram showing a schematic structure of a liquid crystal television according to the present embodiment.

(1) Structure of liquid crystal television
(2) Connection of audio circuit and speaker
(3) Summary
(1) Structure of Liquid Crystal Television:

FIG. 1 is a block diagram showing a schematic structure of a liquid crystal television 100 according to the embodiment of the present invention. In summary, the liquid crystal television 100 includes a tuner circuit 10 connected with an antenna 10a, an audio signal processing circuit 12, an input/output circuit 13, a power supply circuit 14, an inverter circuit 16, a backlight 18, a microcomputer 20, an image signal processing circuit 22, a liquid crystal panel 24, and an infrared light receiving circuit 26.

The microcomputer 20 is electrically connected to the respective sections making up the liquid crystal television 100, and a CPU, which is one of the components making up the microcomputer 20, is adapted to control the entire liquid crystal television 100 according to respective programs written in ROM, RAM and the like, which are also components of the microcomputer 20. The illustration of CPU, ROM, and RAM is omitted herein.

The tuner circuit 10 is adapted to receive television broadcast through the antenna 10a according to the control by the microcomputer 20, extracts an image signal and an audio signal as intermediate frequency signals from the television broadcast signal while carrying out a predetermined signal amplification processing etc., and output the image signal to the image signal processing circuit 22 as well as to output the audio signal to the audio signal processing circuit 12. The audio signal processing circuit 12 is adapted to carry out a predetermined amplification on the audio signal generated in the tuner circuit 10 based on commands from the microcomputer 20, and output the amplified audio signal through the speakers 53a, 53b as audio.

The image signal processing circuit 22 is adapted to digitize the inputted image signal according to the signal level thereof, extract a luminance signal and a color difference signal from the digitized image signal, perform matrix transform processing on the basis of the luminance signal and color difference signal, and reproduce RGB (red, green, blue) signal as image data. The image signal processing circuit 22 is also adapted to convert the continuous interlaced image signal to a progressive image signal, perform a scaling process with respect to the RGB signal so as to match with the number of pixels (aspect ratio: m:n) of the liquid crystal panel 24, and produce image data for one screen to be displayed on the liquid crystal panel 24. Based on the produced image data, a panel drive signal is output to drive each pixel of the liquid crystal panel 24 configured by arrays of pixels, in order to display the image based on the image data on the screen of the liquid crystal panel 24.

Plural terminals 13a for external input, external output, or external input/output are connected to the input/output circuit 13. Specifically, a terminal that is input/output with an analog composite signal, and a terminal that is input/output with audio signal are connected to the input/output circuit 13. Obviously, the terminal to be input with component signal and S video signal, S/PDIF terminal and the like may also be provided to the input/output circuit 13. The image/audio signal externally input to the input/output circuit 13 is output to the image signal processing circuit 22 and the audio signal processing circuit 12, respectively. The image signal and audio signal are provided to the input/output circuit 13 respectively from the image signal processing circuit 22 and the audio signal processing circuit 12, and output to external equipments via a cable connected to the terminal for external output by the input/output circuit 13.

The power supply circuit 14 is adapted to receive a power supply voltage (alternating current) from an external commercial power supply or the like, and generate various voltages from the supplied power supply voltage to thereby supply the generated voltages to each of the circuits of the microcomputer 20, inverter circuit 16 and the like. The power supply circuit 14 is also adapted to cause the voltage supplied to respective circuits to be converted from AC to DC, as necessary.

The inverter circuit 16 is adapted to convert the DC voltage supplied from the power supply circuit 14 to the high frequency AC voltage, and supply the AC voltage to the backlight 18 as a drive signal to thereby cause the backlight 18 to light up, whereupon the backlight 18 acts as a light source that illuminates the liquid crystal panel 24 from the rear face.

The infrared light receiving circuit 26 receives the infrared light remote control signal transmitted from the remote controller 26a, generates a control signal corresponding to the received signal, and outputs the control signal to the microcomputer 20. The remote controller 26a exterior to the liquid crystal television 100 includes plural keys available for use in operation and an infrared light transmission circuit for transmitting infrared light signals towards the infrared light receiving circuit unit 26. The remote controller 26a is adapted to transmit the infrared light signals corresponding to the operation with use of the plural keys in a predetermined format. Obviously, the remote control signal is not limited to the infrared light signal, and applicable to various forms of signals as long as the signals are wireless signals. The infrared light receiving circuit 26 corresponds to a receiving circuit for receiving the remote control signal.

The tuner circuit 10, the audio signal processing circuit 12, and the power supply circuit 14 are formed on an analog substrate A, the microcomputer 20 and the image signal processing circuit 22 are formed on a digital substrate B, the inverter circuit is formed on an inverter substrate C, and the infrared light receiving circuit 26 is formed on a sensor substrate D.

Figure 2:
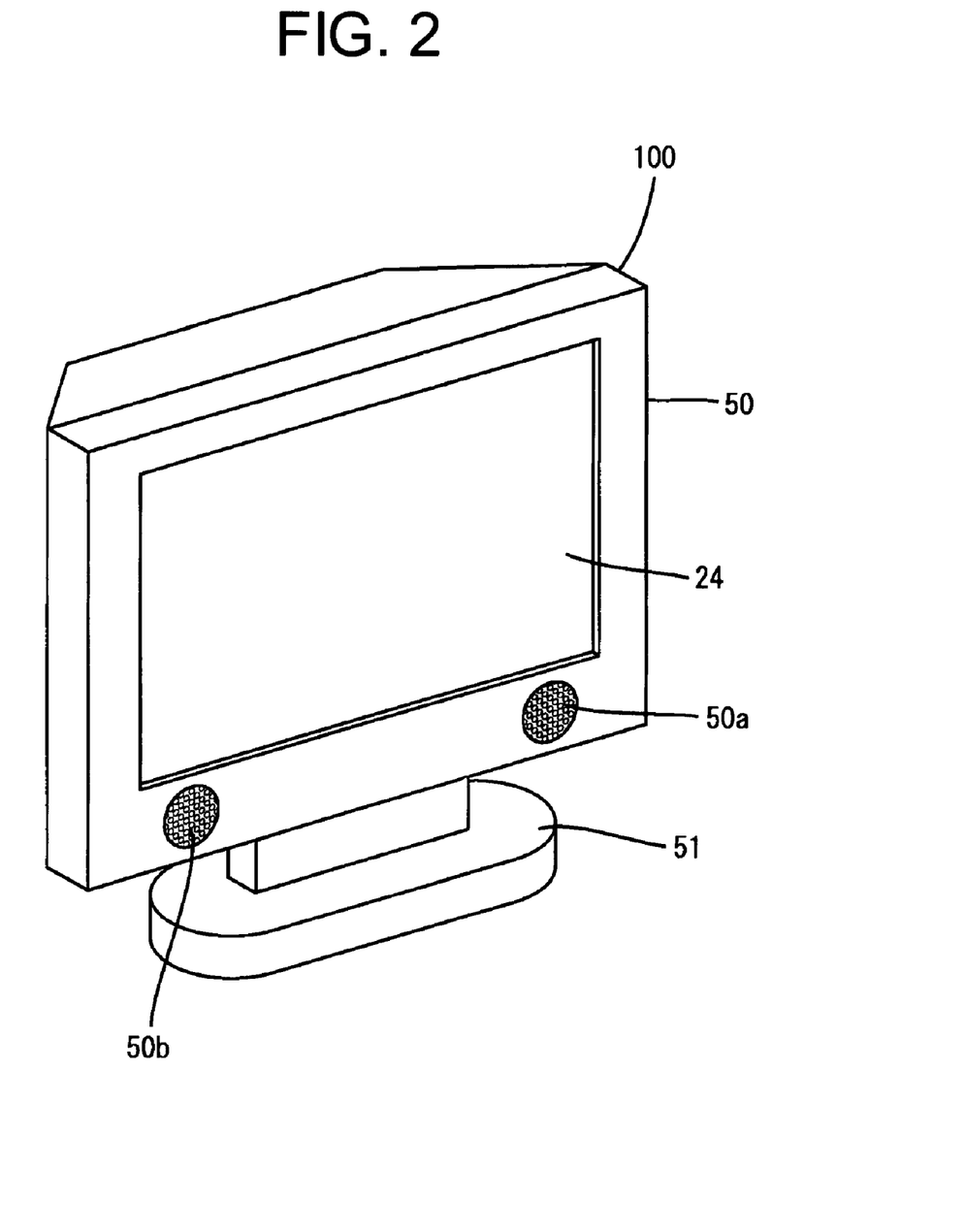
FIG. 2 shows one example of a perspective view of the liquid crystal television seen diagonally from the front.
Figure 3:
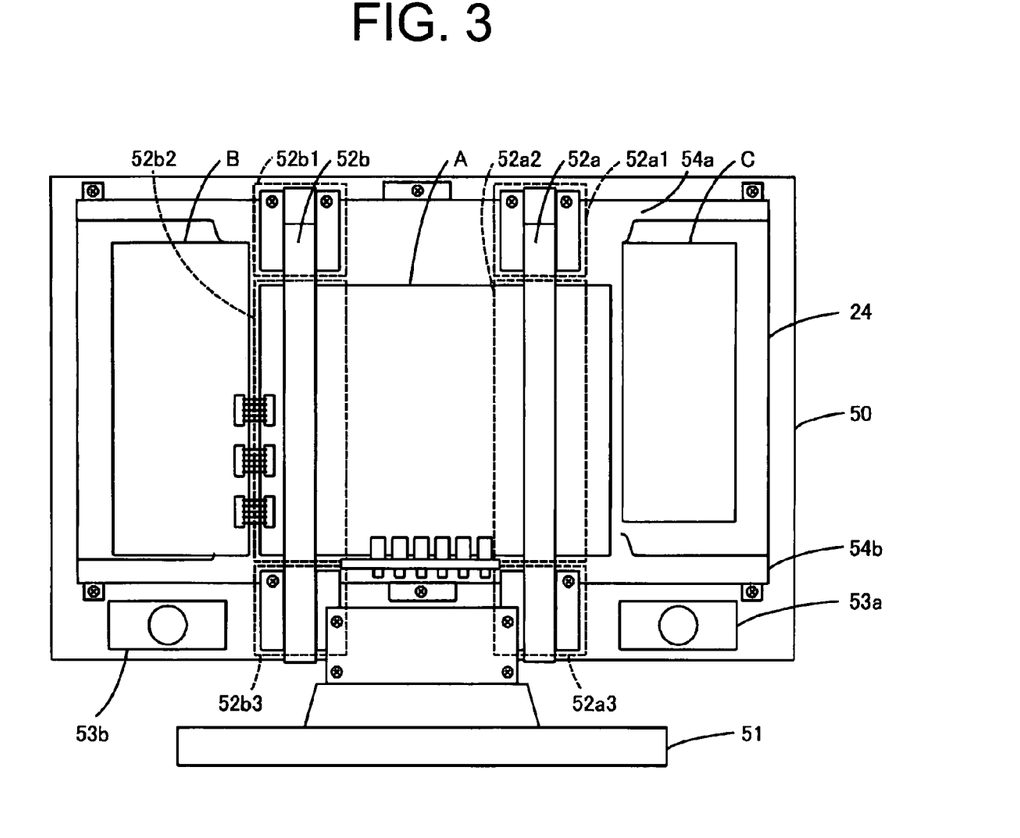
FIG. 3 shows one example of a view of the interior of the liquid crystal television seen from the rear face side.

FIG. 2 is a perspective view of the liquid crystal television 100 seen diagonally from the front, and FIG. 3 is a plan view of the interior of the liquid crystal television 100 seen from the rear face side with the rear cabinet of the liquid crystal television 100 removed.

In FIG. 2, the liquid crystal television 100 is configured by a cabinet 50, a liquid crystal panel 24, and a leg portion 51. The cabinet 50 is configured by a front cabinet and a rear cabinet, where the front and rear cabinets are combined to form a structure that covers substantially the entire liquid crystal television 100. The front cabinet has a substantially rectangular view area, and the display face of the liquid crystal panel 24 is exposed to the front surface side from the view area. The leg portion 51 supports the cabinet 50 in such a manner that the display face of the liquid crystal panel 24 is oriented so as to substantially vertically stand.

A pair of left and right speakers 53a, 53b are arranged below the liquid crystal panel 24 inside the front cabinet (one part of cabinet, reference numeral 50 in FIG. 3) at outer positions in the width direction. Speaker holes 50a, 50b including plural small holes are formed on the back surface of the positions where the speaker 53a, 53b are to be attached, thereby facilitating the transmission of audio output from the speakers 53a, 53b.

The rear face of the liquid crystal panel 24 is covered with a shield panel made from metal, and the backlight 18 is arranged between the shield panel and the liquid crystal panel 24. The backlight 18 includes fluorescent tubes, and light emitting elements such as LED. The backlight 18 illuminates the liquid crystal panel 24 from the rear face to display the image on the screen. The substrates A to C are arranged and fixed on the rear face side of the shield panel.

The sensor substrate D is arranged between the speakers 53a, 53b below the liquid crystal panel 24 in the interior of the front cabinet. The surface of the sensor substrate D and the surfaces of the substrates A to C arranged on the rear face of the shield panel are shifted in the front and back direction by the thickness of the liquid crystal panel 24.

The liquid crystal panel 24 is fixed to the cabinet 50 with an upper fixing sheet metal 54a, lower fixing sheet metal 54b, and bridge frames 52a, 52b. The upper fixing sheet metal 54a has a surface that contacts the upper side surface, upper end of the rear face, and the upper ends of the left and right side surfaces of the liquid crystal panel 24. The lower fixing sheet metal 54b has a surface that contacts the lower side surface, the lower end of the rear face, and the lower ends of the left and right side surfaces of the liquid crystal panel 24. Although not shown, the upper fixing sheet metal 54a is screwed to the liquid crystal panel 24 at the surface contacting the upper ends of the left and right side surfaces of the liquid crystal panel 24, and similarly, the lower fixing sheet metal 54b is screwed to the liquid crystal panel 24 at the surface contacting the lower ends of the left and right side surfaces of the liquid crystal panel 24. Plural projection surfaces projecting above and below the upper fixing sheet metal 54a and the lower fixing sheet metal 54b are screw fixed to screw holes formed at positions corresponding to the cabinet 50. The left bridge frame 52a and the right bridge frame 52b are arranged in the up and down direction parallel to each other with a predetermined spacing in the left and right direction at the rear face side of the liquid crystal panel 24. The left bridge frame 52a and the right bridge frame 52b are respectively screw fixed to the upper fixing sheet metal 54a at the upper end region and to the lower fixing sheet metal 54b at the lower end region. That is, the liquid crystal panel 24 is fixed to the cabinet by the upper fixing sheet metal 54a and the lower fixing sheet metal 54b, and the upper fixing sheet metal 54a and the lower fixing sheet metal 54b are reinforced by the left bridge frame 52a and the right bridge frame 52b. The left bridge frame 52a and the right bridge frame 52b will hereinafter be collectively referred to as bridge frames 52a, 52b.

The upper end of the leg portion 51 is screw fixed to the lower ends of the bridge frames 52a, 52b, whereby the leg portion 51 supports the cabinet 50 and the members accommodated therein.

The shape of the bridge frames 52a, 52b will be described below.

The upper fixing sheet metal 54a is formed to have a cross section of L-shape, and is fixed so as to cover the corner from the upper side surface towards the rear face of the liquid crystal panel 24. The upper fixing sheet metal 54a includes a projection surface having the central portion and both left and right ends of the surface contacting the upper side surface of the liquid crystal panel 24 bent to a canopy shape, and screw holes for fixing the upper fixing sheet metal 54a to the cabinet 50 are formed in the projection surface. Screw holes for fixing the bridge frames 52a, 52b are formed at the portion contacting the rear face of the liquid crystal panel 24 of the upper fixing sheet metal 54a at two positions that divide the upper fixing sheet metal 54a to substantially three equal parts in the left and right direction.

The lower fixing sheet metal 54b has substantially the same shape as of the upper fixing sheet metal 54b, and is fixed so as to cover the corner from the lower side surface towards the rear face of the liquid crystal panel 24. The lower fixing sheet metal 54b includes a projection surface having the central portion and both left and right ends of the surface contacting the lower side surface of the liquid crystal panel 24 bent to a canopy shape, and screw holes for fixing the lower fixing sheet metal 54b to the cabinet 50 are formed in the projection surface. The screw holes for fixing the bridge frames 52a, 52b are formed at the portion contacting the rear face of the liquid crystal panel 24 of the lower fixing sheet metal 54b at two positions that divide the lower fixing sheet metal 54b to substantially three equal parts in the left and right direction.

The bridge frames 52a, 52b include upper bridge pier portions 52a1, 52b1, bridge portions 52a2, 52b2, and lower bridge pier portions 52a3, 52b3, the bridge portions 52a2, 52b2 having a shape that bridges over the analog substrate A. That is, the upper side bridge pier portions 52a1, 52b1 are arranged upright from the upper fixing sheet metal 54a towards the back side of the liquid crystal panel 24, and the lower side bridge pier portions 52a3, 52b3 are arranged upright from the lower fixing sheet metal 54b towards the back side of the liquid crystal panel 24. The bridge portion 52a2 connects the upper side bridge pier portion 52a1 and the lower side bridge pier portion 52a3, and the bridge portion 52b2 connects the upper side bridge pier portion 52b1 and the lower side bridge pier portion 52b3. The bridge frame 52a, 52b are formed by a sheet metal having a cross section in the horizontal direction of a substantially horseshoe shape. That is, the depth of the horseshoe at the upper side bridge pier portions 52a1, 52b1 and the lower side bridge pier portions 52a3, 52b3 is deeper than the depth of the horseshoe at the bridge portions 52a2, 52b2. A flange part is formed at each region of the upper side bridge pier portions 52a1, 52b1 that contacts the upper fixing sheet metal 54a by being bent in such a manner that the surface becomes substantially parallel to the upper fixing sheet metal 54a, and similarly, a flange part is formed at each region of the lower side bridge pier portions 52a3, 52b3 that contacts the lower fixing sheet metal 54b by being bent in such a manner that the surface becomes substantially parallel to the lower fixing sheet metal 54b. Therefore, the bridge portions 52a2, 52b2 get higher than the components arranged on the substrate A, and have bridging shapes that do not interfere with the substrate A and each component of the substrate A and that bridges over the components so as to ensure a predetermined creeping distance with respect to the power supply circuit. The bridge frames 52a, 52b are formed by cutting the sheet metal and performing press working thereon. In this case, the cut surface has a sharp edge since edge treatment such as chamfering of the cut surface of the sheet metal is not performed.

According to such configuration, the upper fixing sheet metal 54a that substantially contacts from the upper side surface towards the rear face of the liquid crystal panel 24 is screwed to the front cabinet, and the lower fixing sheet metal 54b that substantially contacts from the lower side surface towards the rear face of the liquid crystal panel 24 is screwed to the front cabinet. The two bridge frames 52a, 52b are screw fixed to the upper fixing sheet metal 54a and the lower fixing sheet metal 54b so as to bridge in the up and down direction thereby reinforcing the upper fixing sheet metal 54a and the lower fixing sheet metal 54b. The four sheet metals of the upper fixing sheet metal 54a, the lower fixing sheet metal 54b and the two bridge frames 52a, 52b combine to fix and hold the liquid crystal panel 24 to the front cabinet.

The positional relationship between the speakers 53a, 53b, the analog substrate A mounted with the audio signal processing circuit 12, and the bridge frames 52a, 52b will be described.

At least one of the bridge frames 52a, 52b traverse either the left or the right side end of the analog substrate A or the outer side of the left and right side end in the up and down direction. Concretely, the left bridge frame 52a traverses the left side end of the analog substrate A or the outer side of the left side end of the analog substrate A in the up-down direction, and the right bridge frame 52b traverses a right side end of the analog substrate A or the outer side of the right side end of the analog substrate A in the up-down direction. The speaker 53a is arranged on the outer side to the left of the left bridge frame 52a, and the speaker 53b is arranged on the outer side to the right of the right bridge frame 52b. Therefore, when the analog substrate A and each speakers 53a, 53b are directly connected by lead wires, at least one of the lead wires is wired in a manner that might contact the bridge frames 52a, 52b.

(2) Connection of Audio Circuit and Speaker

Figure 4:
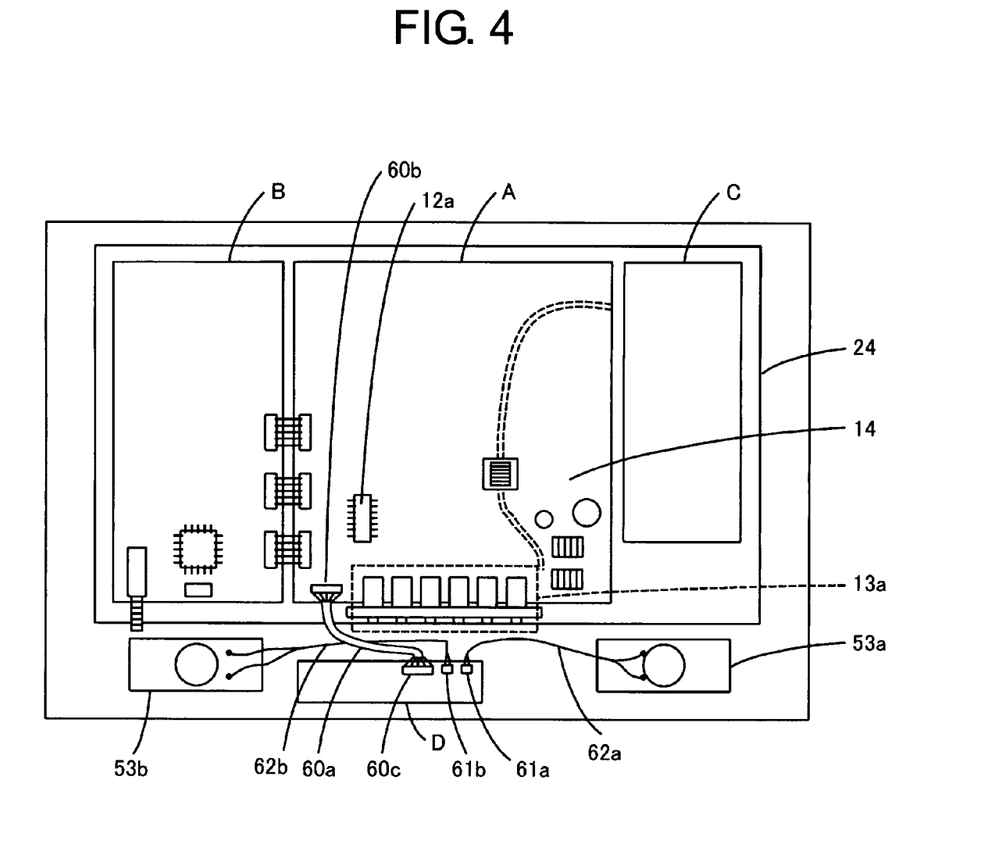
FIG. 4 shows one example of a view of the interior of the liquid crystal television seen from the rear face side.

FIG. 4 is a plan view of the interior of the liquid crystal television 100 seen from the rear face side with the rear cabinet and the bridge frames 52a, 52b of the liquid crystal television 100 removed. The illustration of the upper fixing sheet metal 54a and the lower fixing sheet metal 54b is omitted. In the figure, the analog substrate A, the digital substrate B, and the inverter substrate C are arranged on the shield panel at the rear face of the liquid crystal panel 24. The digital substrate B is arranged to have the long side in the up and down direction at the left side of the rear face, the inverter substrate C is arranged to have the long side in the up and down direction at the right end of the rear face, and the analog substrate A is arranged at the central part as a substantially rectangular substrate.

On the analog substrate A, the power supply circuit 14 is formed from the right side towards the lower right, the audio signal processing circuit 12 is formed from the center towards the left side and the upper side, and the input/output circuit 13 is formed on the lower side. That is, the power supply circuit 14 is formed on the side adjacent to the inverter substrate C on the analog substrate A.

An audio amplifier 12a for amplifying the audio signal is arranged slightly towards the lower left from the center of the analog substrate A. A connector 60b to be connected with a cable 60a is attached to the lower left corner of the analog substrate A. The cable 60a is used to transmit control signal from the remote controller 26a and to transmit control signal for lighting the LED on the sensor substrate D. The cable 60a is passed through the interior of a substantially horseshoe shape of the lower side bridge pier portion 52b3 of the right bridge frame 52b and connected to a connector 60c of the sensor substrate D. The cable 60a is likely to contact the edge portion of the bridge frame 52b, and is thus covered in advance with a protective tube (e.g., UL (Underwriters Laboratories Inc.) tube) to prevent disconnection. The terminal 13a is arranged with the connector parts facing downwards at the lower end of the center of the analog substrate A. The audio signal amplified by the audio amplifier 12a is also output to the sensor substrate D via the connector 60b and the cable 60a. The connector 60b corresponds to the first connector.

The digital substrate B includes an IC for image signal processing, and the digital tuner and the HDMI (registered trademark of HIDMI Licensing LLC) terminal are attached to the lower end with the connector part facing downward. The tuner and the HDMI terminal are exposed to the outside from a predetermined hole formed in the cabinet 50. The digital substrate B and the analog substrate A are connected with a cable, and various signals are transmitted in between.

A pattern for transmitting the left and right audio signals input to the connector 60c to the connectors 61a, 61b is formed in the sensor substrate D, and the amplified audio signal reaches the speakers 53a, 53b connected by way of the connectors 61a, 61b and the lead wires 62a, 62b. The lead wires 62a, 62b are attached to the cabinet 50 with adhesive tape and the like so as not to loosen on the rear face side. The sensor substrate D and the analog substrate A have different substrate surface positions, where the position of the sensor substrate D is on the far side compared to the positions of the analog substrate A and the bridge frames 52a, 52b when seen from the rear face side. The position of the speakers 53a, 53b is also on the far side compared to the positions of the analog substrate A and the bridge frames 52a, 52b when seen from the rear face side. Thus, the lead wires 62a, 62b have sufficient creeping distance with the power supply circuit 14, and do not interfere with the edge portions of the bridge frames 52a, 52b. That is, the lead wires 62a, 62b do not need to be covered with protective tube (UL tube), thereby avoiding increase in cost due to use of the protective tube. The connector 60c corresponds to the second connector, and the connectors 61a, 61b respectively corresponds to the left audio output connector and the right audio output connector.

Figure 5:
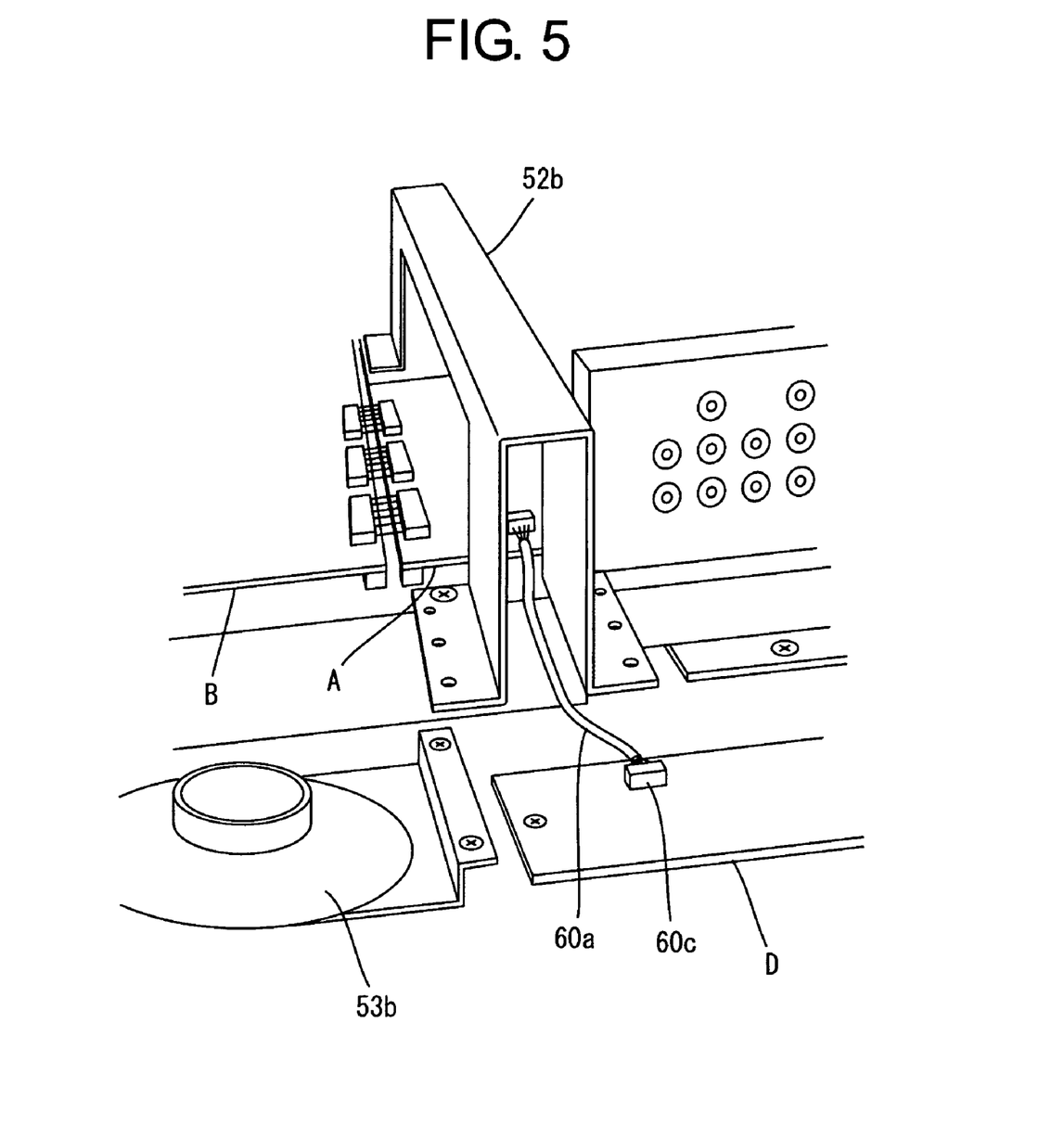
FIG. 5 shows one example of a perspective view of the rear face side of one part of the liquid crystal television.

A case where the lead wire is directly extended from the analog substrate A to the speaker will now be described with reference to FIG. 5. FIG. 5 is a perspective view seen diagonally from below with the rear cabinet of the liquid crystal television 100 removed. When seen from the rear face, the bridge frame 52b is arranged so as to be long in the up and down direction along generally the left end of the analog substrate A. The lead wire always has a possibility of contacting the bridge frame 52b regardless of from which location of the analog substrate A the lead wire is extended from to transmit the audio signal to the right speaker 53b. Therefore, the lead wire must be covered with UL tube, and increase in cost is inevitable.

When extending the lead wire from the lower left of the analog substrate A to transmit the audio signal to the left speaker 53a (not shown in FIG. 5), the lead wire always interferes with the bridge frame 52b, and thus the UL tube is necessary. When a pattern for transmitting the audio signal to the right end of the analog substrate A is formed, and the lead wire is extended from the right end to the left speaker 53a, the lead wire still needs to be covered with the UL tube since the lead wire is positioned in the vicinity of the power supply circuit 14. Furthermore, plural patterns for inputting and outputting the signal with respect to the terminal 13a are formed above the terminal 13a. Thus, a pattern for transmitting audio signal must be formed so as to circumvent such patterns, whereby the pattern length for transmitting audio signal becomes long and substrate designing becomes difficult.

Figure 6:
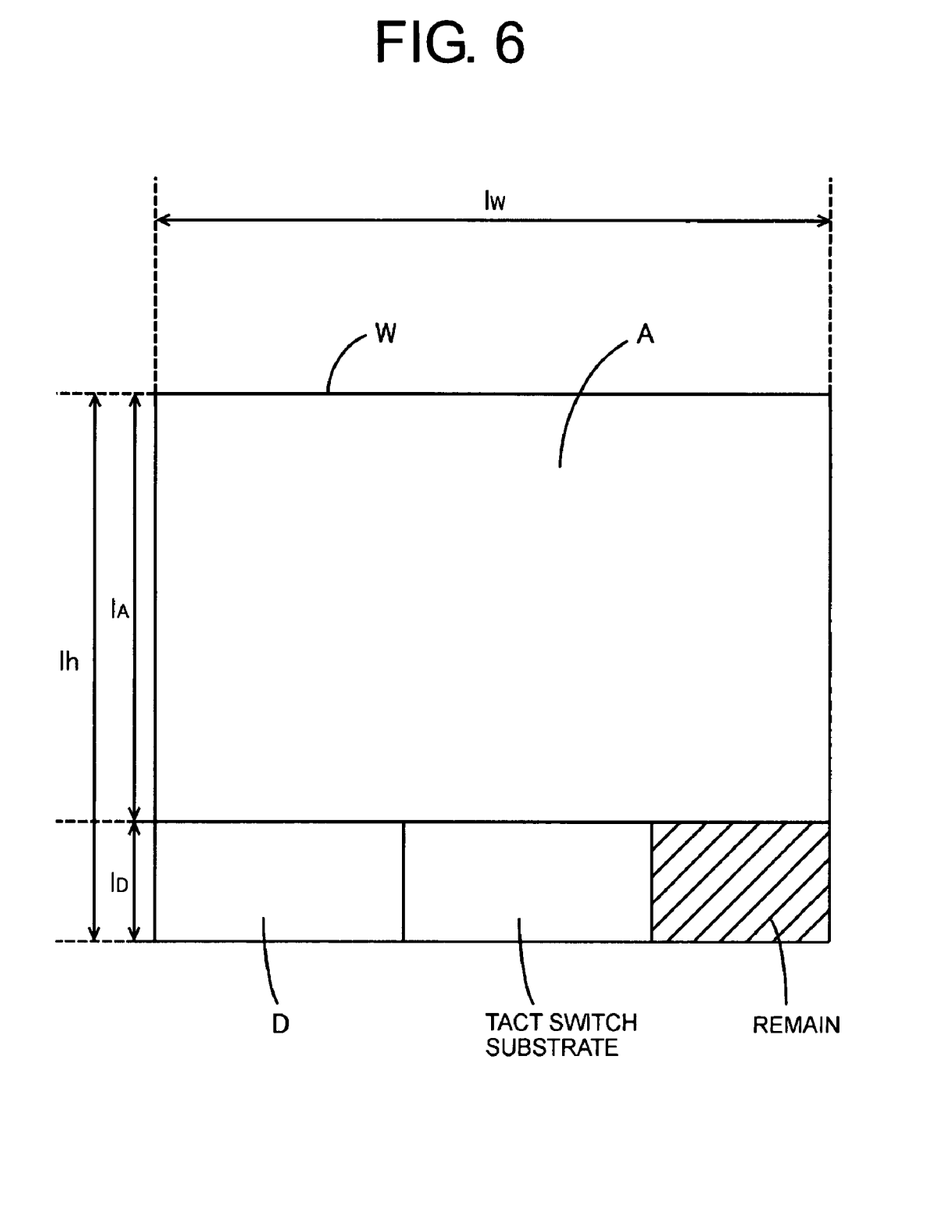
FIG. 6 is a view showing one example of an arrangement relationship of an analog substrate and a sensor substrate on a work substrate.

The sensor substrate D and the analog substrate A are designed and assigned on the same work substrate W. FIG. 6 is a view showing an arrangement relationship of the analog substrate A and the sensor substrate D on the work substrate W. The analog substrate A has a width same as the width 1w of the work substrate W, and has a height 1A shorter than the height 1h of the work substrate W. When the analog substrate A is formed on the work substrate W, the substrate having height of 1D and width of 1W remains on the lower side. The sensor substrate D and a tact switch substrate are designed on such remaining substrate. The tact switch substrate is a substrate formed with a circuit that receives the control signal from a button (not shown) exposed on the upper surface of the cabinet 50 of the liquid crystal television 100 to accept various operations of the user, and sends the control signal to the microcomputer 20. However, a portion still remains, as shown by the shaded region in FIG. 7, even after the analog substrate A, the sensor substrate D, and the tack switch substrate are formed on the work substrate W. That is, even if a pattern for connecting the connector 60c and the connectors 61a, 61b is formed on the sensor substrate D thereby enlarging the sensor substrate D, the sensor substrate D can be sufficiently formed on the work substrate W used in the conventional art. Therefore, cost will not increase even if a new pattern is added to the sensor substrate D.

(3) Summary:

The audio signal is transmitted to the sensor substrate D through a cable 60a connecting the lower end of the analog substrate A arranged on the rear face of the liquid crystal panel and the sensor substrate arranged below the liquid crystal panel of the cabinet. The cable 60a is covered with UL tube, and is passed through the interior of a horseshoe shape of the lower side bridge pier portion 52b3 of the right bridge frame 52b. The audio signal is transmitted to the speakers 53a, 53b via the pattern on the sensor substrate D, the connectors 61a, 61b, and the lead wires 62a, 62b. The liquid crystal television in which the speaker and the audio circuit are connected with lead wires while avoiding breaking of lead wire and increase in cost is thereby obtained.

As one specific configuration, a liquid crystal television is provided, the liquid crystal television including a liquid crystal panel for displaying an image based on an image signal on a display face; a substrate arranged on a rear face of the liquid crystal panel, for performing a predetermined signal processing on an input audio signal and outputting a processed signal; a cabinet including a substantially rectangular hole for exposing the display face to a front and accommodating the liquid crystal panel and the substrate on an inside; an upper fixing sheet metal fixed to an upper side of the liquid crystal panel and the cabinet; a lower fixing sheet metal fixed to a lower side of the liquid crystal panel and the cabinet; a left bridge frame and a right bridge frame bridged between the upper fixing sheet metal and the lower fixing sheet metal; a sensor substrate fixed below the liquid crystal panel in an interior of the cabinet, the sensor substrate connected with a predetermined cable for transmitting a received remote control signal to a first connector of the substrate; a left speaker arranged and fixed on an outer side to a left of the left bridge frame at below the liquid crystal panel in the interior of the cabinet, for outputting audio based on the audio signal; and a right speaker arranged and fixed on the outer side to a right of the right bridge frame at below the liquid crystal panel in the interior of the cabinet, for outputting audio based on the audio signal; the left bridge frame and the right bridge frame are respectively formed by upper bridge pier portion arranged upright from the upper fixing sheet metal towards the back side of the liquid crystal panel, lower bridge pier portion arranged upright from the lower fixing sheet metal towards the back side of the liquid crystal panel, and a bridge portion for connecting the upper bridge pier portion and the lower bridge pier portion; the left bridge frame traverses a left side end of the substrate or an outer side of the left side end of the substrate in the up-down direction; the right bridge frame traverses a right side end of the substrate or an outer side of the right side end of the substrate in the up-down direction; a power supply circuit is formed at a prescribed position of lower corners on the substrate; an audio amplifier is arranged at a position that is vicinity of lower corners of the substrate and is away from the power supply circuit; the first connector is arranged at the lower corner of the side arranged with the audio amplifier; a pattern for transmitting the audio signal from the audio amplifier to the first connector is formed on the substrate, the audio signal being output to the sensor substrate via the predetermined cable; the sensor substrate includes a second connector connected with the predetermined cable, a left audio output connector connected with the left speaker, a right audio output connector connected with the right speaker, and a pattern for transmitting the audio signal output from the second connector to the left audio output connector and the right audio output connector; the predetermined cable is covered with a protective tube, and is passed through the inside of the bridge frame to connect to the second connector; and the audio signal is transmitted from the sensor substrate to the right speaker and the left speaker through lead wires respectively connected to the left audio output connector and the right audio output connector.

Incidentally, it is needless to say that the present invention is not limited to the embodiment described above. Although it is obvious to persons skilled in the art, the application of the mutually interchangeable members, configurations and the like disclosed in the above embodiment by changing their combination as required, the application of the members and configurations not disclosed in the above embodiment but being publicly known art and mutually interchangeable with the members and configuration disclosed in the above embodiment by interchanging them or by changing their combination as required, and the application by replacing by and changing as required the combination of the members and configurations not disclosed in the above embodiment but which any person skilled in the art may be able to envisage as substitute for the members and the configuration disclosed by the above embodiment based on the publicly known art and the like, are disclosed as an embodiment of the present invention.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A liquid crystal television including a left speaker and a right speaker for outputting audio based on an audio signal respectively, comprising:

a liquid crystal panel for displaying an image based on an image signal on a display face;

a first substrate arranged on a rear face of the liquid crystal panel, for inputting the audio signal, performing a predetermined signal processing on the audio signal and outputting the processed audio signal, the first substrate mounts with an audio amplifier for the predetermined signal processing;

a cabinet including a substantially rectangular hole for exposing the display face to a front and accommodating the liquid crystal panel and the first substrate on an inside;

an upper fixing sheet metal fixed to an upper side of the liquid crystal panel and the cabinet;

a lower fixing sheet metal fixed to a lower side of the liquid crystal panel and the cabinet;

a left bridge frame and a right bridge frame bridged between the upper fixing sheet metal and the lower fixing sheet metal;

a sensor substrate fixed below the liquid crystal panel in an interior of the cabinet, the sensor substrate connected with a predetermined cable for transmitting a received remote control signal to a first connector of the first substrate;

the left speaker arranged and fixed on an outer side to a left of the left bridge frame at below the liquid crystal panel in the interior of the cabinet; and the right speaker arranged and fixed on the outer side to a right of the right bridge frame at below the liquid crystal panel in the interior of the cabinet;

the left bridge frame and the right bridge frame are respectively formed by upper bridge pier portion arranged upright from the upper fixing sheet metal towards the back side of the liquid crystal panel, lower bridge pier portion arranged upright from the lower fixing sheet metal towards the back side of the liquid crystal panel, and a bridge portion for connecting the upper bridge pier portion and the lower bridge pier portion;

the left bridge frame traverses a left side end of the first substrate or an outer side of the left side end of the first substrate in the up-down direction;

the right bridge frame traverses a right side end of the first substrate or an outer side of the right side end of the first substrate in the up-down direction;

a power supply circuit is formed at a prescribed position of lower corners on the first substrate;

the audio amplifier is arranged at a position that is in the vicinity of the lower corners of the first substrate and is away from the power supply circuit;

the first connector is arranged at the lower corner of the side arranged with the audio amplifier;

a pattern for transmitting the processed audio signal from the audio amplifier to the first connector is formed on the first substrate, the processed audio signal being output to the sensor substrate via the predetermined cable;

the sensor substrate includes a second connector connected with the predetermined cable, a left audio output connector connected with the left speaker, a right audio output connector connected with the right speaker, and a pattern for transmitting the processed audio signal output from the second connector to the left audio output connector and the right audio output connector;

the predetermined cable is covered with a protective tube, and is passed through the inside of either the left bridge frame or the right bridge frame to connect to the second connector; and the processed audio signal is transmitted from the sensor substrate to the right speaker and the left speaker through lead wires respectively connected to the left audio output connector and the right audio output connector.

2. A liquid crystal television including a left speaker and a right speaker for outputting audio based on an audio signal respectively, comprising:

a liquid crystal panel for displaying an image based on an image signal on a display face;

a first substrate arranged on a rear face of the liquid crystal panel, for inputting the audio signal, performing a predetermined signal processing on the audio signal and outputting the processed audio signal, the first substrate mounts with an audio amplifier for the predetermined signal processing;

a cabinet including a substantially rectangular hole for exposing the display face to a front and accommodating the liquid crystal panel and the first substrate on an inside;

fixing sheet metals for fixing the liquid crystal panel to the cabinet while covering at least one part of the rear face of the liquid crystal panel;

a left bridge frame and a right bridge frame fixed to the fixing sheet metals;

a sensor substrate fixed below the liquid crystal panel in an interior of the cabinet, the sensor substrate connected with a cable for transmitting a received remote control signal to a connector of the first substrate;

the left speaker arranged and fixed on an outer side to a left of the left bridge frame at below the liquid crystal panel in an interior of the cabinet; and the right speaker arranged and fixed on an outer side to a right of a right bridge frame at below the liquid crystal panel in the interior of the cabinet;

the cable is covered with a protective tube;

the left bridge frame traverses a left side end of the first substrate or an outer side of the left side end of the first substrate in the up-down direction;

the right bridge frame traverses a right side end of the first substrate or an outer side of the right side end of the first substrate in the up-down direction;

a power supply circuit is formed at a prescribed position of lower corners on the first substrate;

the connector is arranged at a position that is in the vicinity of the lower corners of the first substrate and is away from the power supply circuit;

a pattern for transmitting the processed audio signal from the audio amplifier to the connector is formed on the first substrate, the processed audio signal output to the sensor substrate via the cable; and the processed audio signal is transmitted from the sensor substrate to the right speaker and the left speaker through lead wires.

* * * * *